(12) United States Patent
Fung et al.

(10) Patent No.: US 7,570,660 B1
(45) Date of Patent: Aug. 4, 2009

(54) APPARATUS FOR IMPLEMENTING TRANSPARENT SUBWAVELENGTH NETWORKS

(75) Inventors: Eddie Fung, Englishtown, NJ (US); Lawrence J. Nociolo, Fair Haven, NJ (US); Martin Nuss, Fair Haven, NJ (US); Steven A. Surek, Leonardo, NJ (US); Ted K. Woodward, Holmdel, NJ (US)

(73) Assignee: CIENA Corporation, Linthicum, MD (US)

( * ) Notice: Subject to any disclaimer, the term of this patent is extended or adjusted under 35 U.S.C. 154(b) by 734 days.

(21) Appl. No.: 10/956,855

(22) Filed: Oct. 1, 2004

Related U.S. Application Data

(60) Provisional application No. 60/508,000, filed on Oct. 2, 2003.

(51) Int. Cl.
*H04J 3/16* (2006.01)
(52) U.S. Cl. .................. 370/466; 370/442; 370/512; 370/516; 398/102
(58) Field of Classification Search .............. 370/466, 370/467, 469, 537–540, 907, 474, 476, 442, 370/503–516; 375/293, 294, 373, 376; 398/98–102
See application file for complete search history.

(56) References Cited

U.S. PATENT DOCUMENTS 7,006,525 B1 * 2/2006 Jha .............................. 370/466
7,099,584 B1 * 8/2006 Narvaez et al. ............... 398/98
2002/0191640 A1 * 12/2002 Haymes et al. ............. 370/466
2003/0048813 A1 * 3/2003 Lahav et al. ................ 370/537
2003/0112833 A1 * 6/2003 Kamiya ..................... 370/466
2005/0058187 A1 * 3/2005 Groen et al. ................ 375/219
2005/0286521 A1 * 12/2005 Chiang et al. .............. 370/389

OTHER PUBLICATIONS

Michael J. Klein and Ralph Urbansky, "Network Synchronization—A Challenge for SDH/SONET?", Sep. 1993, IEEE Communications Magazine, pp. 42-50.*

* cited by examiner

*Primary Examiner*—Ricky Ngo
*Assistant Examiner*—Pao Sinkantarakorn
(74) *Attorney, Agent, or Firm*—Clements Bernard PLLC; Christopher L. Bernard; Tyler S. Brown

(57) ABSTRACT

A network element for incorporating in nodes of a network that is a transparent, subwavelength networks. The element is configurable and adapted to support an arbitrary protocol, with protocol-specific monitoring features as well as protocol-independent add/drop capability. An arrangement that allows transmission of client signals with higher clock fidelity is achieved by developing a phases offset measure at an ingress node, communicating it to the egress node, and recovering the client's clock from the received data and from the received phase-offset information. The ability to recover the client's clock with high fidelity is enhanced by modified pointer processing in intermediate nodes of the network that the client's signal traverses. The pointer processing is modified to inject positive and negative justifications in excess of what is minimally necessary to insure proper transmission over a network that employs a protocol involving framing layer frames embedded in communication layer frames. Illustratively, the network protocol is an extended G.709 Digital Wrapper protocol, arranged to employ frames of 15240 columns by four rows.

24 Claims, 5 Drawing Sheets

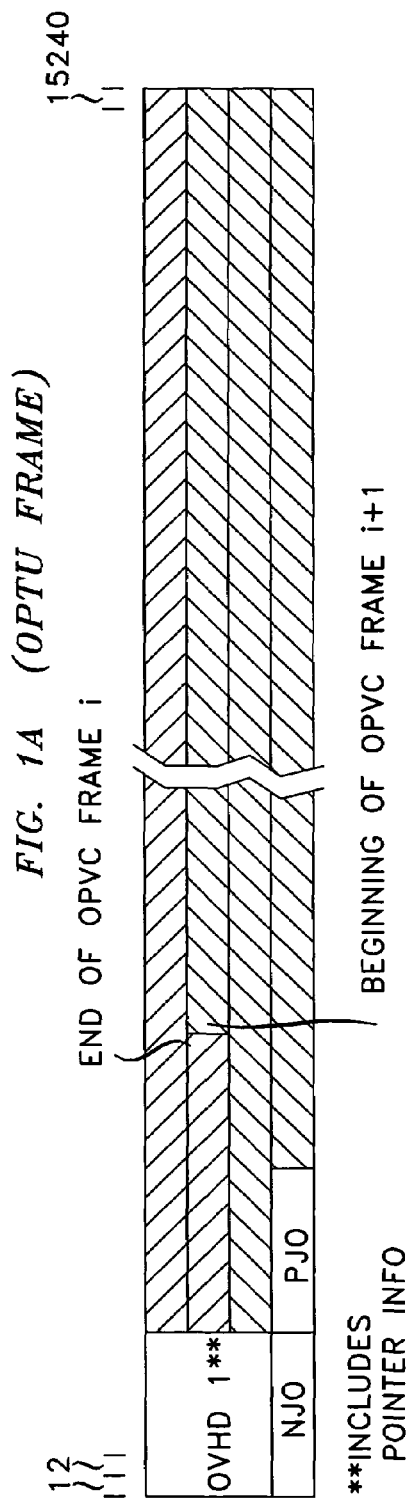
FIG. 1A (OPTU FRAME)
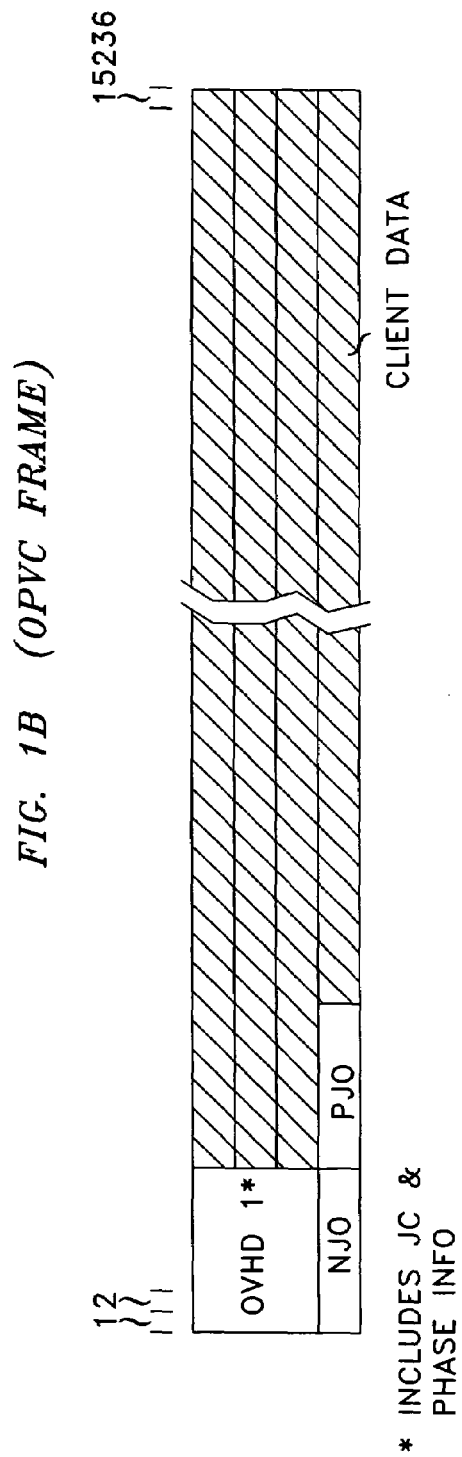
FIG. 1B (OPVC FRAME)

APPARATUS FOR IMPLEMENTING TRANSPARENT SUBWAVELENGTH NETWORKS

RELATED APPLICATIONS

This non-provisional patent application is related to, and claims the benefit of U.S. Application No. 60/508,000, filed on Oct. 2, 2003, and U.S. application Ser. No. 10/895,007 filed Jul. 20, 2004, which are also hereby incorporated by reference.

BACKGROUND

This application relates to data transport arrangements that allow a provider to support any client data protocol, as well as provide quality of service monitoring that is ascertainable without delving into the client's signal. More particularly, this application relates to an arrangement that, for example, allows a subwavelength SONET client signal to be transported transparently and with sufficiently high fidelity so that inherent timing information of the signal is maintained. Furthermore, this application discloses an arrangement that facilitates the realization of networks capable of supporting any client data protocol with a particularly flexible and cost effective manner through use of wide-bandwidth physical layer devices used in combination with programmable logic elements and reconfigurable optical elements.

A transport provider that wishes to offer high capacity facilities to customers can implement the offer by simply providing so-called "dark fiber," allowing the customers to place whatever signals they wish on the fiber.

One value proposition is for the provider to offer a fiber and a "service," whereby a channel is provided for transmission of information, with a guarantee that the transmitted information will arrive at its destination with an agreed-to quality of service. To provide the agreed-to quality of service, the provider sends the information over the fiber in a particular protocol that is chosen by the provider, monitors the quality of the service, and performs appropriate maintenance activities, as needed. That means that the provider carries on the fiber various signals that do not belong to the customer for the purpose of monitoring the quality of service. Dark fiber clearly cannot meet this value proposition.

An advanced value proposition is for the provider to offer a fiber, and to also offer a plurality of channels, concurrently, using a particular protocol, with the channels adapted to carry client signals. SONET is an example of such a value proposition. SONET encapsulates a client-provided signal into successive Synchronous Payload Envelope (SPE) blocks of data, injects these blocks into successive SONET frames, modulates numerous SONET frames onto different wavelengths, and places them onto a fiber. The reverse process takes place when data needs to be extracted.

One aspect of SONET is that it offers clients a variety of bandwidths. The lowest SONET bandwidth (OC-1) is capable of carrying a DS3 signal, having a 44,736 Mb/s rate, and the SONET standard contemplates higher bandwidths in multiples of OC-1. However, commercial equipment that carries SONET signals over fiber handles only OC-3, OC-12, OC-48, and OC-192 signals. Intermediate rates are generally multiplexed into one of these four signal rates.

Another aspect of SONET is that it can be add/drop multiplexed, meaning that a given channel can be extracted from, or added to, the information signal that is contained in a given wavelength without having to extract all of the other channels that are contained in the information signal, or to reconstitute the information signal.

Still another aspect of SONET is that it carries it's own maintenance information, permitting the provider to offer a guaranteed level of service quality without having to delve into the client's signal per se.

What would be desirable that SONET cannot provide is the ability to transmit client signals that themselves are SONET frames, transparently, and in a bandwidth efficient manner while maintaining the timing integrity of the client SONET signals themselves. By "transparently" what is meant is that the offered client's signal (e.g., an OC-3 SONET signal) can be communicated through the network, from an ingress node to an egress node, in a manner that allows the client's signal to be multiplexed onto a fiber with one or more other signals, where the other signals possibly have different bandwidths, or different protocols, and where the other signals may be time-division-multiplexed onto the same wavelength, or onto different wavelengths, the client's signal can have any desired protocol (i.e., including SONET), the client's signal can be add/drop multiplexed at any point in the network without requiring add/drop operations on other signals and, correspondingly, add/drop operations need not be undertaken relative to the client's signals when add/drop multiplexing is performed on some other signal on the fiber, and the provider is able to ascertain quality of service provided to the client without having to look into the client's signal per se.

As indicated above, SONET fulfills the above transparency requirements, except that it does not allow the client to send a signal that itself follows the SONET protocol while maintaining the timing integrity of the SONET client signal. Clearly, for example, one cannot send an OC-3 SONET client data frame as a unit over an OC-3 SONET frame, because the payload bandwidth of the provider's OC-3 frames is simply not large enough to carry both the payload and the overhead of the client's signal. One possibility that has been studied by Lucent Technologies is to stuff an OC-3 frame into an OC-4 signal. After extensive efforts it was concluded that this proposal was not able to meet the SONET timing standards for the client SONET signal. This is clearly evident in FIGS. 5-18(a) of T1X1.3/2002-036 contribution to the T1 Standard Project—T1X1.3. This contribution, titled "Jitter and Wander Accumulation for SONET/SDH over SONET/SDJ (SoS) Transport" by Geoffrey Garner, dated Sep. 30, 2002, which is hereby incorporated by reference. Note that all simulation depicted in the aforementioned FIGS. 5-18(a) are above the OCN Reference Mask; where the need is to be below this mask.

Separately, the Digital Wrapper standard exists (G.709) that contemplates signals flowing in frames having one of three line rates. The lowest rate (OTU1) carries 20,420 frames/s, and each frame consists of 16,320 bytes that structurally can be viewed as 4 rows and 4080 columns. Sixteen columns are devoted to overhead, 3808 columns are devoted to client payload, and 256 columns are devoted to forward error correction, which results in a payload rate of approximately 2.666 Gb/s. The OTU1 rate can be used to communicate a 2.48832 Gb/s OC-48 SONET signal, as the payload area was sized for that capacity. Equipment exists to terminate a number of SONET signals and, after removing their payload information (SPE), multiplex the individual payloads to form an OC-48 signal, to encapsulate it in an OUT1 digital wrapper, and to modulate the resulting signal onto a chosen wavelength. To date, however, no design exists for channelizing the Digital Wrapper for the many lower rate data services that a telecommunications carrier is called upon to transport, such as the above-mentioned OC-3 signal, i.e., a design that allows one to carry sub-multiples of the OTU1 signal (also termed sub-wavelength channels) using the Digital Wrapper standard.

It is additionally important that equipment used to embody aforementioned advantages be cost effective and readily deployed in service provider networks. To effectively accomplish this, it is desirable that a single equipment element embody all the aspects of transparency defined above. This implies that said equipment must be readily reprovisionable to address any protocol, or at least most of the expected protocols, be capable of supporting transparent SONET as well as other protocols, be capable of add/drop support, and be able to ascertain the quality of service being offered.

Cost effectiveness often requires that a given equipment element be adapted to support multiple physical ports. However, it is clearly advantageous that service be provisionable on a port by port basis, with each port being able to be provisioned without disturbing traffic on other ports of the element. Such an arrangement is facilitated by the use of any-rate or multi-rate physical layer devices that can demultiplex a given serial signal and lock to it's clock rate, in combination with programmable logic elements to which signals can be applied for quality of service monitoring. Also, protocol-independent elements to interconnect these aforementioned port-specific capabilities are required.

SUMMARY

An advance in the art is realized by extending the Digital Wrapper standard G.709 to create a tributary group from OTU1 16 frames forming a tributary group. This group this group is mapped onto a grouping of 64 OTN tributary frames that are di-byte interleaved. Each tributary frame thus can be viewed as a block of 15240 columns and 4 rows, where the first 4-column section is devoted to overhead. The remaining columns are devoted to payload data, with the fourth row of the overhead section assigned to negative pointer justification opportunities, and the following four bytes (in columns 5th through 8th) are assigned to positive pointer justification opportunities. The payload data section is able to hold OPVC1 frames, each of which has an overhead section, and preassigned negative and positive justification byte positions.

With the extended Digital Wrapper protocol, which seamlessly dovetails with the G.709 standard, data that entered an ingress node is synchronized to the local clock and a phases offset measure is developed and included in the transmitted signal. This measure is evaluated repeatedly, for example, every OPVC1 frame. At an egress node, the phase-offset measure that is received with the signal is employed to derive a more accurate client signal clock, and this enables the network to support client signals that need to be communicated with high clock fidelity, such as SONET signals.

Additionally, in order to minimize jitter and wander, pointer processing that is performed in each intermediary node through which a signal travels between the ingress and egress nodes is modified to introduce positive and negative justification bytes in excess of what is minimally necessary so as to shift energy into higher frequencies that can be filtered out by the phase lock loop at the egress node.

The above-mentioned capabilities are realized with multi-port equipment that employs an optical port interface device, with wide-band continuous-rate clock recovery elements, and port-by-port programmable logic elements for data handling and quality of service monitoring. Switching and add/drop functions are further supported through distributed or centralized switching fabrics that operate in a protocol-independent manner to effect cross-connect as well as the traffic add and drop capabilities.

BRIEF DESCRIPTION OF THE DRAWINGS

FIGS. 1A and 1B depict a tributary frame in accord with the principles disclosed, and an OPVC1 frame that is injected payload of the tributary frame;

DETAILED DESCRIPTION

Figure 2:
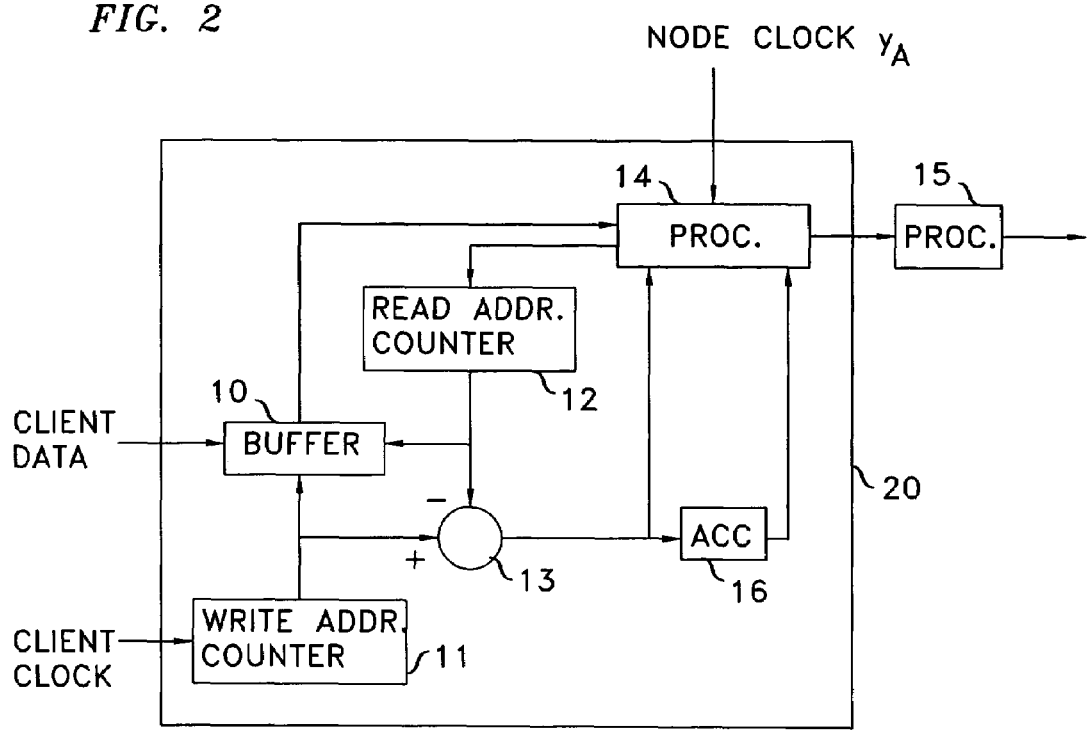
FIG. 2 is a block diagram showing selected aspects of an ingress node in accordance with the principles disclosed herein

To gain an appreciation for the disclosed advance, it is beneficial to review the timing problems that arise in the SONET network in spite of the fact that all nodes in a SONET network nominally operate off a common clock. There are two specific timing problems of interest: timing impairments as a result of mapping the client signal into the SONET frame, and timing impairments resulting from SONET pointer processing. Each of these will be discussed separately.

SONET employs a layered structure, with one layer concerning itself with framing, and another with the payload being carried. As for the framing layer, a SONET STS-1 signal consists of a sequence of frames each containing 810 bytes that can be viewed as a 90 column by a 9 row arrangement, where the first three columns contain transport overhead byes. Of the 27 available header bytes, 9 bytes (the three transport overhead bytes of the first three rows) are devoted for Section Overhead, and 18 bytes are devoted for Line Overhead. The remaining 87 columns make up the STS-1 envelope capacity, which contains the synchronous payload envelope (SPE). The first column of the SPE is devoted to Path Overhead, and two columns (columns 30 and 59) are devoted to "fixed stuff". This leaves 756 bytes in the SPE for client data, which is sufficient for mapping a DS3 client data signal.

The SPE can be placed into the STS-1 envelope capacity beginning at any byte position within the STS-1 envelope capacity. The location of the first byte of the SPE (which is called the J1 byte) is identified by a pointer that is contained in the first two bytes of the Line Overhead (H1 and H2 bytes) of the STS-1 frame.

A SONET client's input data that enters a SONET ingress node (e.g., node A) is mapped into the SPE using conventional buffering techniques. That is, client's data is written into a buffer memory at the client's clock frequency, and is outputted from the buffer memory at the ingress node's clock frequency. The read-out clock frequency, on the average, ought to be the same as the write-in clock, so as not to cause an overflow or underflow. In order to prevent a possible underflow of the buffer when the read-in clock is consistently slower, the read-out operation is stalled (no data is read) at prespecified points of the SPE, as necessary. In order to prevent overflow when the clock situation is reversed, data is read out at times within the SPE that normally are not used for reading out data. A SONET frame is then created (having a fixed number of data bytes) by inserting the SPEs into the SONET frames as indicated above, using the pointer to identify where the SPE begins, and once the SONET frame is created, it can be sent out, for example, to node B.

It is important to note that these operations (stalling the reading out process and/or reading out extra data) introduce phase jumps in the mapped data stream, which cause timing impairments in a recovered client signal. We refer to this as mapping impairments.

Considering what happens at node B, it is possible that the frequency of the node B clock might be slightly different from that of the node A clock even though the intent of the SONET network is for all nodes to operate off a common clock (this can occur during timing reference failures or due to the introduction of noise into the timing signals). Because of this possibility and because of normal propagation delays in the signal flows throughout the network, node B must perform at least the following steps:

1. derive an approximation of the node A clock, $\hat{y}_A$, from the incoming signal,
2. using clock $\hat{y}_A$, extract the header information that is within the incoming frame,
3. using clock $\hat{y}_A$, extract the payload information that is within the incoming frame,
4. process the extracted header information and react to it,
5. using clock $y_B$, create new header information for an outgoing frame,
6. using clock $y_B$, inject the extracted payload, into the outgoing frame, and
7. send out the newly created frame (at clock rate $y_B$).

Of the above steps, step 6 is the most challenging, because of the asynchrony between the clocks $\hat{y}_A$, and $y_B$. The task is to create an SPE that is to be inserted into a node B SONET frame, which operates at rate $y_B$, and to do so from data that is received from node A at frequency $\hat{y}_A$. If $y_B > \hat{y}_A$ (even a little) the data arrives more slowly than it leaves, and a consequence of this is that every so often the outputting of actual data must be arrested because there is no data to output. Since the node's output is at a constant clock rate ($y_B$), during a clock period when there is no data, the system must simply wait and, effectively output a dummy data byte. In order to avoid having to output dummy bytes whenever a no-data condition exists, a buffer is included that, though it introduces delay, affords the flexibility to place dummy bytes in prespecified overhead positions (the byte position immediately following the H3 byte of the Line Overhead). Since the SONET frames that are created by node B are outputted at a fixed rate, the insertion of a dummy byte in an SPE shifts the positioning of the following SPE forward within each SONET frame. To remain aware of the positioning of the SPE starting point, the pointer in the SONET frame's overhead is adjusted (incremented) to specify where the starting point of the SPE is.

Correspondingly, if $y_B < \hat{y}_A$, the data arrives more quickly than it leaves, and a consequence of this is that, though the arriving data can be buffered, eventually all of it must be placed within an outgoing SPE, in some otherwise unused byte position, or else an overflow condition would occur. That means that an SPE, or at least the SONET frame, must have such an unused byte position. Indeed, the SONET design includes a byte in the header (the H3 byte) that can be so used. Thus, when $y_B < \hat{y}_A$, every so often (depending on the size of the difference between $y_B$ and $\hat{y}_A$) a data byte must be stuffed into the available byte position that does not normally carry client data (H3 byte). Consequently, the SPE ends at one position sooner than it would otherwise, and the next SPE's J1 byte is stored one position sooner as well. Correspondingly, the pointer is decremented to correctly specify the SPE's starting point.

All of this shifting of SPE's, inserting dummy bytes, and/or inserting extra data bytes is carried out with what is typically referred to as "pointer processing." A side effect of the pointer processing, or more specifically of the addition of dummy bytes or extra data bytes, that results from the asynchrony between clock $y_A$ and $y_B$ is that the number of actual client bytes in an SPE differs from frame to frame creating phase jumps, and client signal timing impairments are thus introduced. In addition, as each node performs its own pointer processing functions, asynchronously of all other nodes, pointer adjustment decisions may be made at the same time in successive nodes, causing an accumulation of error.

If the client's data were to be extracted at node B, i.e., if node B were the egress node, it would be quite simple to extract the SPEs based on knowledge of their starting points (provided by the pointer), extract the overhead bytes of the SPEs, identify the dummy bytes and stuffed bytes from apriori information about the nature of the input signal (i.e., number and location of the "fixed stuff" columns) and from the pointer, and output the extracted client data as it is unmapped from the SPE. This unmapping yields the client's signals, but at an irregular rate. There is a hiatus during the 27 transport overhead bytes (that, on occasion, may include a data bye in H3), a hiatus during the 9 path overhead bytes, a hiatus during (at least some of) the 18 fixed stuff bytes (from columns 30 and 59), and a hiatus during the inserted dummy bytes. The client, however, desires its data to be provided by the egress node at a constant rate, and desirably, at the rate at which the data was offered to the ingress node. In addition, the client signal could conceivably traverse multiple SONET networks (due, for example, to the fact that a service may need to be carried via multiple service providers in order to be transmitted end-to-end, i.e., from a local exchange carrier (LEC) to an inter-exchange carrier (IXC) to another LEC). Thus, multiple segments that each have pointer processing, and possibly mapping and unmapping, may be cascaded and the timing impairments introduced by each segment would accumulate, giving rise to a client signal whose clock is impaired. The timing impairments produced by these operations make it impossible to use a received client signal (i.e., that signal derived from the SPE) that is a SONET signal which is used as a source of timing for another SONET network.

Refocusing on the objective of offering a facility to transport client data of any protocol transparently, including SONET, in order to compensate for the above effects in the SONET network, in accord with the principles disclosed herein a different transport protocol is used, to wit, the Digital Wrapper standard G.709, which happens to be very similar to SONET, but is flexible enough to permit including a number of unique and novel features in the network's nodes that are not defined for current or next generation SONET equipment. These functions, which do not exist in current generation equipment, and are not defined for next generation Digital Wrapper or SONET equipment, are compensation for the timing impairments introduced end-to-end by the client signal mapping and unmapping process, and node-to-node compensation for the timing impairments introduced by the pointer adjustments received from the previous node.

The compensation for end-to-end timing impairments introduced due to client signal mapping and unmapping functions is addressed through the use of phase-offset information that is derived from the phase difference between the ingress client clock and the ingress node system clock. The phase-offset information is transported end-to-end with the data signal and is used to compensate the egress client clock derived from the outgoing client data stream. This eliminates most of the client egress clock timing error due to mapping/unmapping functions.

The compensation for node-to-node timing impairments introduced due to pointer processing is addressed through the use of a pointer filter in conjunction with an adaptive pointer generator that filters upstream pointers generated by previous nodes and adaptively generates its own pointers in a manner that allows downstream filters to remove their effects in succeeding nodes. This advanced pointer processor is described in more detail later.

In accord with an embodiment disclosed herein, the low rate of the Digital Wrapper standard G.709, i.e., OTU1, is used as the underlying network transport mechanism, which carries data in frames running at the rate of approximately 20,420 frames/sec. To provide for the sub-wavelength channels, i.e., for the transporting of signals lower than the SONET OC-48 signals, in accord with the principles disclosed herein an extension to the G.709 Digital Wrapper standard is provided. The extension takes 64 consecutive OTU1 frames, where each frame having 14 columns of overhead at the beginning of each frame, and combines the payload (3808 columns) and payload overhead (2 columns) areas into a very large frame (243,840 columns). Within that very large frame the columns are divided to create 16 frames (also referred to herein as OPTU1 frames, or communication layer frames), that are time division multiplexed and di-byte interleaved timeslots, by assigning the first two columns of the large frame assigned to timeslot #1, the second two columns to timeslot #2, etc. through to the $16^{th}$ timeslot, and then repeating the assignments until all columns of the large frame are assigned, thereby attaining effectively communication layer frames having 15,240 columns each. This frame is illustrated in FIG. 1A. Each OPTU1 frame has four columns of overhead and 15,236 columns of timeslot envelope capacity (similar to STS-1 envelope capacity). The four columns of overhead (OVHD) contain pointer information (which controls the operation of an advanced pointer processor to be described later) in the first three rows of the frame and 4 stuff byte positions (negative justification opportunity bytes (NJO)) in the fourth row of the frame. The remaining 15,236 columns constitute the envelope capacity, which includes 4 potential dummy byte positions (positive justification opportunity bytes (PJO)) next to the 4 stuff byte positions in the fourth row of the frame. In such an arrangement, the payload envelope is a frame (herein referred to as an OPVC1 frame, or framing layer frame) that is not unlike the SONET's SPE, which frame contains four columns of timeslot path overhead and 15,232 columns of payload data (into which the client signal is mapped). This is illustrated in FIG. 1B. The overhead bytes of the fourth row are reserved for negative justification bytes, and the four bytes in the fourth row that follow the negative justification bytes are reserved for positive justification bytes. The path overhead includes 10 bits reserved for phase-offset information, and two mapping justification bits (JC). A JC value of 00 means that no dummy bytes were inserted and no extra bytes were stuffed, a JC value of 01 means that four data bytes were inserted, and a JC value of 11 means that four dummy bytes were stuffed.

The 15232 columns of payload data can exactly contain an OC-3 signal as long as the OPVC1 and OC-3 clock are running at their nominal rates.

As the above-described structure suggests, one of the similarities between the Digital Wrapper standard, as extended, and SONET is that both employ the layered structure, where one layer concerns itself with framing (placing the client's data into frames) and another layer concerns itself with the payload being carried. One significant difference between SONET and the Digital Wrapper standard is that the former is synchronous, whereas the latter is asynchronous. That is, although all of the nodes' clocks of a network employing the Digital Wrapper standard are close to each other (within ±40 ppm of each other), there is no requirement that they must be the same.

Thus, in accord with the principles disclosed herein, a client's signal at an ingress node (node A) has to be mapped into the payload area of an OPVC1 frame, with dummy bytes (positive justification), or extra data bytes stuffed (negative justification), as appropriate (as described above), as well as any residual phase-offset information that exists between the client signal clock and the node A clock, and the OPVC1 frame has to be placed into an OPTU1 time slot segment, with an appropriate pointer included in a header portion that points to the beginning of the OPVC1 frame.

FIG. 2 shows is a block diagram showing selected aspects of an ingress node in accordance with the principles disclosed above. Client data is applied to buffer 10, and the client clock is applied to write address counter 11. Under control of the client clock and address counter 11 client data is stored in buffer 10 (which is sometimes referred to as an elastic store). The line from counter 11 to buffer 10 includes both the address bits and the write command. The node's clock $y_A$ is applied to processor 14, which gates the clock as necessary and applies the gated clock to read counter 12. The output of counter 12, which includes both the address bits and a read command, is applied to buffer 10 and, under influence of counter 12, data is read out from butter 10 and applied to processor 14.

The clock gating performed by processor 14 accounts for the header bytes that need to be included in order to create OPVC1 frames, and the justification that needs to be undertaken because of the difference in clock rates between the client's clock and the node's clock. Negative justification is required when the client's clock is higher than nominal and, therefore, bytes need to be stuffed; positive justification is required when the client's clock is lower than nominal and, therefore, dummy bytes need to be inserted; or no justification is undertaken when neither stuffed bytes nor dummy bytes are called for.

Information about the need to justify comes from the read and write counters. Specifically, it is recognized that the difference between the read and write addresses should be bounded if no underflow or overflow should occur in buffer 10, and it is beneficial to have that difference remain as constant as possible. Therefore, the addresses of write counter 11 and read counter 12 are applied to subtractor 13, and the difference is applied to processor 14. Based on that difference, processor 14 determines whether bytes need to be stuffed, dummy bytes need to be inserted, or neither task needs to be undertaken, and behaves appropriately, including creating the appropriate justification control (JC) bits.

The difference produced by subtractor 13 is also applied to sampler 16. Illustratively, once per frame, just after a justification opportunity, the sampler samples the value of the difference that exists between the write counter 11 and the read counter 12. This represents the residual phase-offset between the client clock and the gated system clock, and this difference is applied to processor 14. The phase-offset information is written in to the frame overhead area and transported to the client egress de-mapper at the other end of the network, to be used to regenerate an accurate representation of a clock for the client's signal at the egress node.

The bytes received by processor 14 from buffer 10 based on the gated clock are then augmented with the appropriate JC bits, phase-offset information, and other overhead information, and formatted to create OPVC1 frames at the output of element 20. These frames are applied to processor 15, which creates OPTU1 frames.

Processor 15 injects OPTU1 overhead bytes into the created OPTU1 frames, determines where within the OPTU1 frame the created OPVC1 frames are to be inserted, generates and inserts an appropriate pointer that points to the beginning of the OPVC1 frame in the OPTU1 payload envelope, inserts the OPVC1 frame, and thus creates the OPTU1 frames at the output of processor 15.

Figure 3:
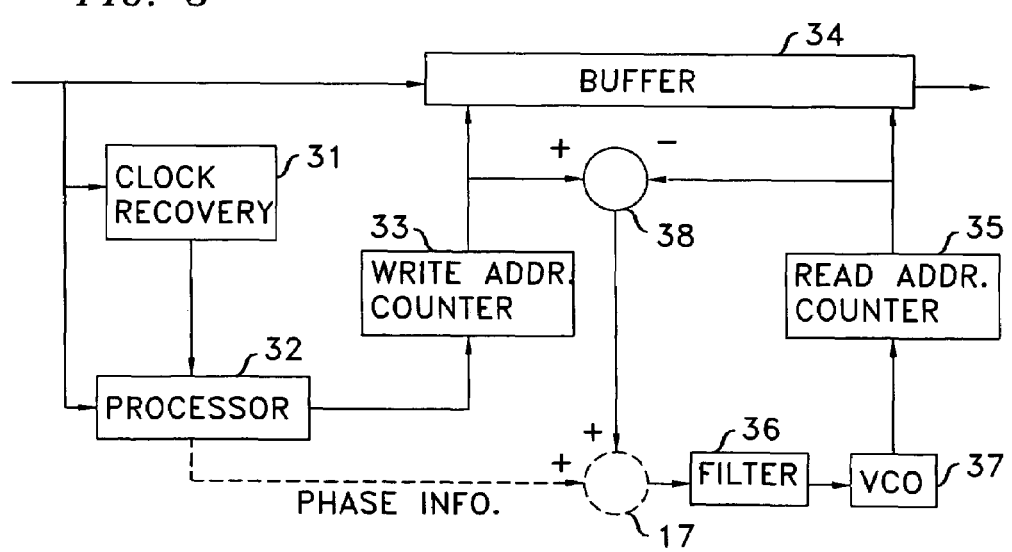
FIG. 3 is a block diagram showing selected aspects of an egress node that complements the ingress node of FIG. 2.

At the egress node, for example, node Z, the reverse of this process must be performed, that is, de-mapping of the client signal from the OPVC1 frame. An embodiment of this process is illustrated in FIG. 3. In FIG. 3, data originating from an upstream node is applied to clock recovery circuit 31 and to processor 32. Circuit 31 recovers the clock of the previous node, and applies it to processor 32. Processor 32 identifies the beginning of the OPTU1 frame, handles the OPTU1 overhead bytes, identifies the pointer, identifies the beginning of the OPVC1 frame, identifies and processes the justification control bits and the phase-offset information and creates a gapped clock that is applied to write counter 33. This gapped clock is an approximation of the gapped clock generated by node A, the gated YA clock, during the mapping process. Under control of address and write commands that are applied by counter 33 to buffer 34, the incoming client data is stored in buffer 34.

Separately, address counter 35 that is advanced by variable control oscillator (VCO) 37 reads data out of buffer 34. The address of counter 35 is subtracted from the address of counter 33 in element 38, and the resulting difference is applied to low pass filter 36. The output of low pass filter 36 controls VCO 37.

The arrangement comprising elements 35, 38, 36 and 37 is a phase lock loop (PLL) arrangement that keeps the difference between counter 33 (which is advanced by the estimate of the gated $y_A$ clock) and counter 35 fairly stable. This is a mirror image of the feedback arrangement found in FIG. 2, which keeps the difference between counters 11 and 12 fairly stable, where counter 12 is advanced by clock $y_A$. Consequently, the data read out of buffer 34 is fairly close in frequency to the client's data arriving at node A.

If not dealt with, the two impairments discussed earlier, end-to-end mapping impairments and node-to-node pointer processing impairments, will corrupt the quality of the client timing information so as to make it unusable as a timing reference. The amelioration of the node-to-node pointer processing impairments will be discussed below, however the end-to-end mapping will be discussed here. The justification operations performed by the mapping function in node A are essentially controlled by the difference in frequency between the incoming client clock and the OPVC1 clock derived from the node A system clock. If the derived OPVC1 clock is running at a rate that allows the client signal to be almost exactly matched to the OPVC1 payload rate then justification operations will be very infrequent. This creates phase jumps in the client signal data that occur at a very slow rate producing significant low frequency components. The de-mapper at node Z contains the low pass filter 36 that can filter some of this noise, however the cutoff frequency cannot be made arbitrarily low. Therefore, whatever cutoff frequency is specified, a difference between OPVC1 clock and client clock can be determined that will produce low frequency components below the cutoff frequency of the de-mapper filter thus corrupting the client timing. The phase-offset information is added to address this issue.

The phase-offset information extracted by processor 32 is applied to filter 36 via summer 17. The phase-offset information, being updated once per frame, provides a sampled data representation of the frequency components of the client and OPVC1 clock differences, which when summed with the recovered phase difference produced by subtractor 38, nulls out the low frequency error, essentially eliminating the impairment.

Node-to-node pointer processing impairments are introduced by intermediate nodes; i.e., nodes between the ingress node of a signal, and the egress node of a signal. More particularly, the ingress node participates in pointer generation, the egress node participates in pointer interpretation, and the intermediate node participate in pointer interpretation and generation—which we call pointer processing. As a signal arrives at an intermediate node (with respect to the client ingress node, node A), for example, node B, the clock of the arriving signal is extracted, and the OPVC1 frame is extracted from the payload of the OPTU1 frame in a manner similar to that described above in connection with SONET frames (i.e., with the aid of the pointer within the OPTU1 frame's header). At this point the extracted OPVC1 frame is operating on timing that was derived from node A, however, to transmit the OPVC1 frame to the next downstream node it must be operating on local, node B, timing. This is accomplished by adjusting the pointer value (pointer processing) inserted into the outgoing OPTU1 frame in a manner that is also similar to that described in connection with SONET frames. The pointer processing shifts the entire OPVC1 frame within the associated OPTU1 frame, and when the clocks of nodes A and B are relatively close to each other, the negative and positive justifications create low frequency timing components associated with the OPVC1 frame that are embedded in the OPTU1 frame. These low frequency components propagate through the network and ultimately appear at the egress client de-mapper (the operation of this is described above). As was discussed, arbitrary low frequency components cannot be eliminated by the de-mapper low pass filter, and the resulting wander, which can accumulate as the signal passes through network nodes constitutes a problem for communicating client signals that are SONET signals.

Borrowing from a proposal by Michael Klein et al for advanced pointer processing in SDH/SONET networks, in an article entitled "Network Synchronization—A Challenge for SDH/SONET?" *IEEE Communication Magazine*, September 1993, pp 42-50, an advanced pointer processor would operate as described below.

The general concept behind the advanced pointer processor is to generate pointers such that they contain predominantly high frequency energy which is filtered out at succeeding nodes before generating new pointer values. Specifically, an OPTU1 frame and its timing are recovered from the incoming data stream. Through interpretation of incoming pointer information, an OPVC1 clock is generated from the incoming OPVC1 data stream contained within the OPTU1 frame and any incoming pointers generated by upstream nodes are filtered out (the pointers are responsible for node-to-node timing impairments). The extracted data can then be injected into an OPTU1 frame outgoing from the node under control of an adaptive pointer generator and then be transmitted out of the node. The adaptive nature of the pointer generator provides spectral shaping of the impairments caused by pointer generation, that is, the frequency content of the noise created by the generated pointers is shifted to higher frequencies. This spectral shaping, which is derived from concepts based on sigma-delta modulation, creates a noise spectrum that allows downstream pointer filters (discussed above) to easily remove the pointer generated timing impairments. The combination of incoming pointer filtering and adaptive outgoing pointer generation makes up an advanced pointer processor.

Figure 4:
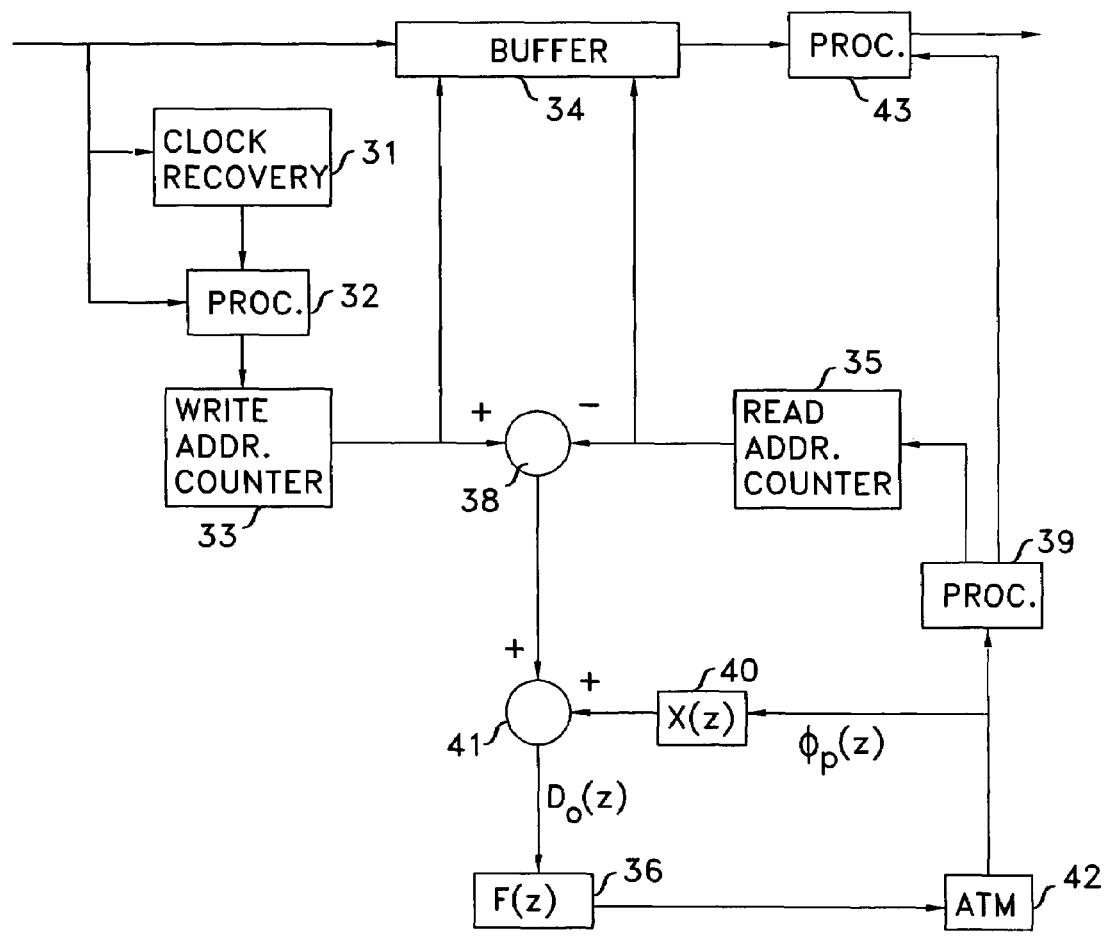
FIG. 4 is a block diagram of a node through which a signal traverses between the ingress node and the egress node.

In accord with the principles disclosed herein, each node undertakes pointer processing that aims to minimize the low frequency components by performing spectral shaping of pointer impairments. It does so by adaptively undertaking negative justifications and compensating positive justifications (or vice versa) where, otherwise, no justification is necessary. In other words, each node injects voluntary positive and compensating negative justifications. This is effected with a circuit like the one shown in FIG. 4. It is similar to the FIG. 3 circuit, except that VCO 37 is replaced by ATM circuit 42, and includes an additional feedback loop, through compensation filter 40 having a transfer function X(z) and summing node 41. The output of buffer 34 in FIG. 4 delivers OPVC1 frames that are processed via processor 43, which adds outgoing pointer information and generates outgoing OPTU1 frames.

In this implementation the compensation filter 40 is required because the incoming pointer filter 36 is located such that it not only filters the incoming write clock (processor 32 produces the write clock which drives write counter 33 which in turn is processed by subtractor 38, thereby producing a write clock component which would then be filtered by filter 36), but also filters the outgoing pointers (processor 39 produces the pointer adjustment signal that controls the read counter 35 which in turn drives the subtractor 38, thereby producing a read clock component that contains pointer adjustment phase information which would then be filtered by filter 36). Since the outgoing pointers must not be filtered (that would essentially nullify the pointer operation which is required in order to compensate for the input and output clock differences), a compensation circuit, compensation filter 40, must be provided to nullify the effects of incoming pointer filter 36 on any adaptive outgoing pointer generation functions performed by adaptive threshold modulator 42.

To determine the transfer function of filter 36, it is noted that the address of read counter 35, which can be represented by a cumulative phase signal, $\phi_r(z)$, is effectively equal to the sum of the phase of the node's clock (gated to account for the overhead bytes), $\phi_n(z)$, and any phase shift due to pointer adjustments, $\phi_p(z)$; i.e., $\phi_r(z)=\phi_n(z)+\phi_p(z)$. The pointer adjustment signal is the cumulative phase shift resulting from pointer justification operations, either no pointer justification, positive justification of four bytes, or negative justification of four bytes. It is also noted that the address of write counter 33 can be represented by a cumulative phase signal, $\phi_w(z)$.

The output signal produced by the phase detector 38 that is applied to summing node 41, which is a number that changes each time the read or the write counters (35 and 33, respectively) are incremented, and also represents a phase signal, is the difference between the read and write addresses $D_o(z)=\phi_n(z)+\phi_p(z)-\phi_w(z)$. The output of filter 40 is $X(z)\phi_p(z)$, and therefore the input to filter 36 is $D_o(z)+\phi_p(z)X(z)$, or $\phi_n(z)-\phi_w(z)+\phi_p(z)(1+X(z))$. The output of filter 36, therefore, is $$[\phi_n(z)-\phi_w(z)+\phi_p(z)(1+X(z))]F(z). \tag{1}$$

We observe that for proper operation, the input to adaptive threshold modulator 42 must equal the phase difference between the read clock (which includes pointer adjustments) and the filtered write clock, that is, the outgoing pointer adjustments that appear as part of the read clock must not be filtered. Therefore, for proper operation the input to adaptive threshold modulator 42 must correspond to $$(\phi_n(z)-\phi_w(z))F(z)+\phi_p(z) \tag{2}$$

Setting equation (1) equal to equation (2) yields $$X(z)=(1-F(z))/F(z). \tag{3}$$

We found that the transfer functions pair $$X(z) = \frac{(1-z^{-1})(1-az^{-1})}{K(1-bz^{-1})} \tag{4}$$

and $$F(z) = \left(\frac{K}{K+1}\right)\frac{(1-bz^{-1})}{1-\left(\frac{1+a+Kb}{K+1}\right)z^{-1}+\left(\frac{a}{K+1}\right)z^{-2}} \tag{5}$$

with X(z) representing a differentiated first order high pass function and F(z) representing a second order low pass filter function, work well.

The implementation suggested by equation (4) for X(z) includes a $(1-z^{-1})$ term, which represents a differentiator function, followed by a high pass filter. The input to the X(z) function is the cumulative phase output of the adaptive threshold modulator 42, which is represented by a stairstep function that jumps up or down by four bytes of phase magnitude whenever a positive or negative pointer justification occurs. Differentiation of this type of signal produces a series of unit impulses at each positive or negative pointer justification. By including this differentiation function as part of the ATM functionality and having processor 39 operate on simple positive or negative justification indications instead of cumulative phase, the differentiation term in X(z) can be eliminated.

Figure 5:
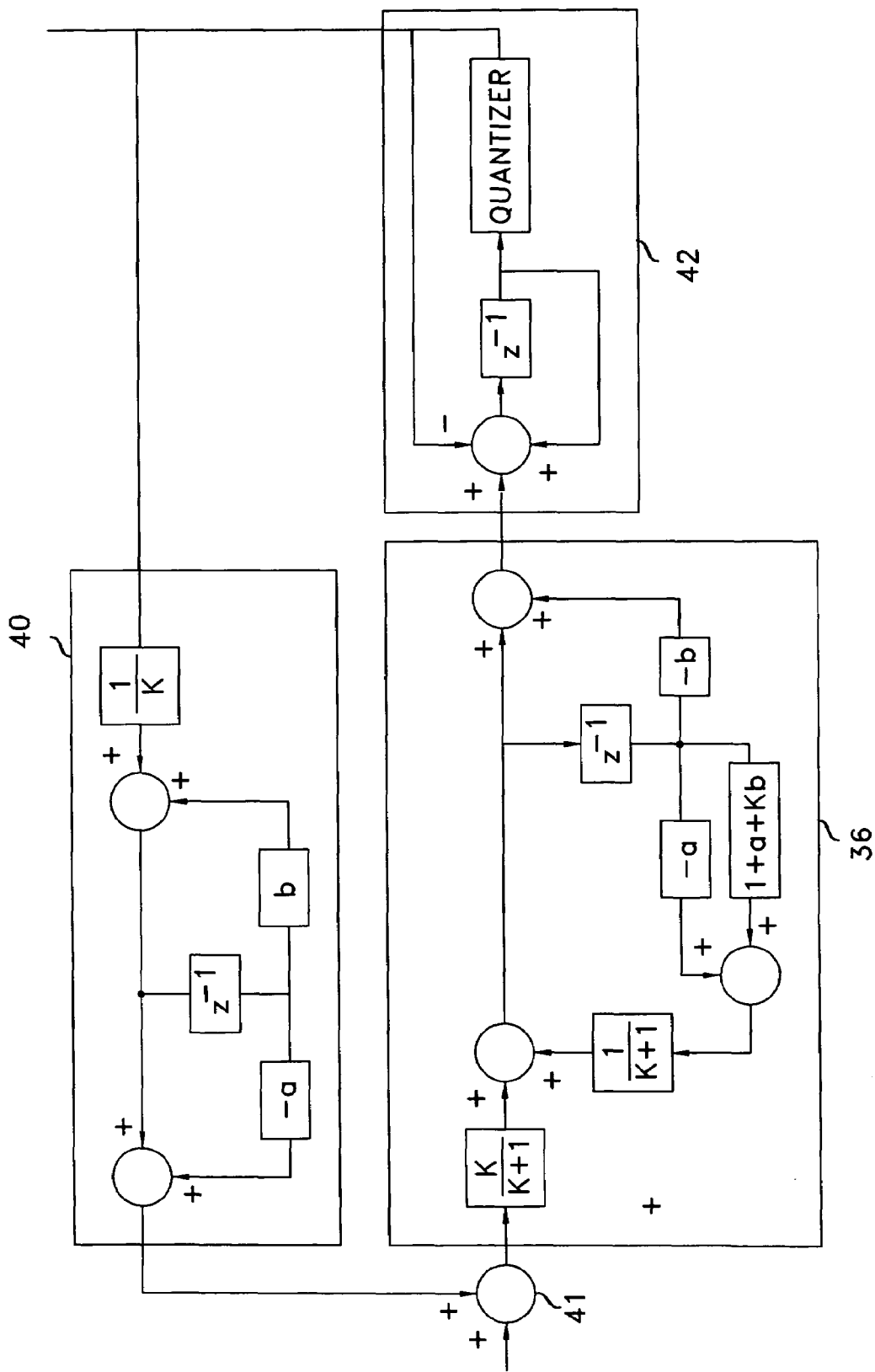
FIG. 5 shows the circuit arrangement that performs modified pointer processing.

The resulting implementation of FIG. 5 shows the physical implementation of these filters, including the implementation of the ATM circuit 42. It should be noted that the quantizer block simply makes the pointer adjustment decisions instead of outputting cumulative phase information.

This processing performed at node B is performed at each succeeding downstream node until the client signal egress node is reached. As a signal arrives at the egress node, for example, node Z, the clock of the arriving signal is extracted, and the OPVC1 frame is extracted from the payload portion of the OPTU1 frame in the same manner as described for node B. Also, as for node B, an OPVC1 clock is generated from the incoming OPVC1 data stream and any incoming pointers generated by upstream nodes are filtered. The signal is then processed as described above for the egress node de-mapping function.

Figure 6:
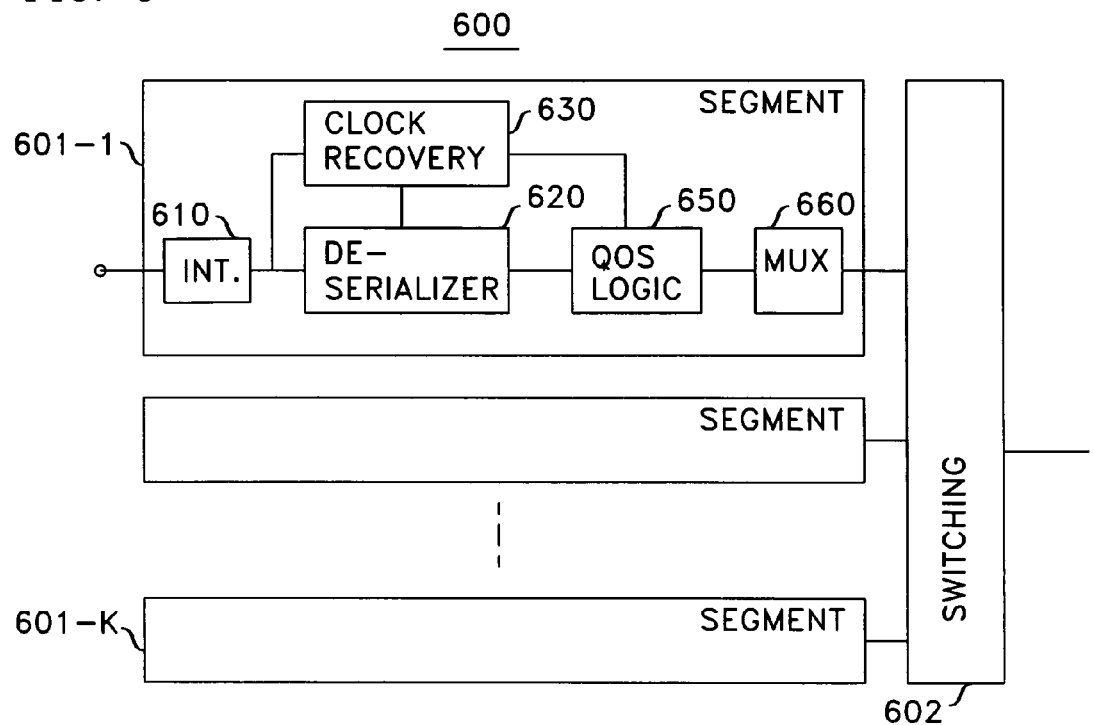
FIG. 6 shows a block diagram of an equipment element adapted to support the above-mentioned transparency attributes.

FIG. 6 depicts a block diagram of a multi-port network element capable of supporting the value propositions of transparency as defined herein, as well as embody the algorithms disclosed above. It includes a plurality of segments 601-1-601-N, and a common module 602 to which segments 601-1-601-N are connected. Each segment performs "port functions," which allows the needs of different signals applied to the different ports of the network element to be satisfied and mapped to a preselected protocol. The shared multi-port functions of the preselected protocol that need to be carried out are performed in module 602. It is noted that the FIG. 6 diagram depicts a uni-directional arrangement—the ingress direction—for sake of simplicity, but it should be understood that bi-directional network elements are easily realized and are within the scope of this disclosure.

The network element of FIG. 6 represents a circuit board that is plugged into a larger piece of equipment. It also represents a shelf of equipment that comprises a plurality of circuit boards, and it also represents the entirety of a network node.

Within each segment, such as segment 601, element 610 is an optical input/output device. Advantageously element 610 is a modular optical element that advantageously is pluggable; for example, a commercially available small form factor pluggable (SFP) optical device, such as offered by Stratos, Finisar, and JDS Uniphase. The use of a pluggable device is beneficial because the cost of optical-to-electrical conversion is primarily tied to and increasing with the data rate. While any user-configurable element would work, the SFP has the advantage of being relatively compact compared to other user-pluggable interfaces that are currently available, and contains only the essential optical components for bit-serial optical to electrical conversion.

Coupled to element 610 is deserialization element 620 which, under influence of a clock from timing control circuit 630 converts the serial input to a stream of bytes (or parallel words of other length), in a conventional manner. Of course, in bi-directional embodiment, element 620 serializes the data.

Timing control circuit 630 derives a clock signal of the incoming signal from the signal itself in a perfectly conventional manner by use of a phase lock loop.

It is noted that recently, so-called 'continuous rate PHY' devices have become commercially available from a number of vendor, for example, Philips, and these can be employed for the purpose of deriving deserialized data streams from an incoming signal together with a clock, for subsequent processing. In other words, these commercial devices implement the function of circuit 620 and the clock recovery function of circuit 630. In fact, these current commercial devices are suitable for bi-directional embodiments. Current technology makes the entire frequency band from 30 Mb/s to 3.125 Gb/s accessible, and one may expect that accessible protocol frequency ranges will increase. By using these commercially available devices, cost-effective transparency applications become possible because a single integrated circuit may be employed for the serialziation/deserialization operation.

An additional requirement of the timing control circuit 630 is to perform the timing operations (pointer processing, adaptive threshold modulation) disclosed above. See, for example, FIG. 5 and the discussion pertaining thereto. As demonstrated in the above disclosure, these functions are particularly important to address the requirements of protocols such as SONET that require line-based output timing to be regenerated. Because many distinct timing control operations may be required, depending on the protocol that each port is configured to handle, it is advantageous to include programmable logic elements within control circuit 630 to realize various ones of the function, such as digital filtering and phase locked loops. Field programmable gate arrays (FPGAs) constitute a suitable option for achieving the desired programmability.

Each port of the FIG. 6 network element may be provisioned to handle a specific and distinct protocol, and therefore different segments of the network element may consume a different number of time slots inside the digital wrapper envelope disclosed above. Consequently, combining the time slots into the digital wrapper requires specific operations that may differ from port to port. Further, at least because each port may be handling a different protocol, per port quality of service monitoring is important. To that end, the FIG. 6 network element includes service monitoring logic circuit 650.

Circuit 660 client signal segments that are wraped with information pursuant to the extended digital wrapper protocol and thus creates time slot signal. It can also be implemented as a distinct circuit, or implemented as a combined single element (chip) 640.

The specifics of the logic implemented within circuit 650 depends on the client protocol that is being handled, and since the protocol that is being handled is configurable, it follows that logic circuit should, advantageously, be programmable. One can create an application specific integrated circuit (ASIC) without general programmability features being used as circuit 650. However, because it is always possible to imagine a data protocol arising after the creation of the ASIC which the administrator of the FIG. 6 network element and a user might wish to agree to, it is clearly advantageous to be able to reprogram the functions of the device. It is noted that, given the rates of current data protocols and the capabilities of general purpose computing elements (e.g. microprocessors), general purpose computing devices are not suitable for the 650 and 660 modules. By contrast, a programmable logic device (PLD) can be re-programmed to support practically any new protocol. Further, a complex network node might have many ports (tens to hundreds), and that places a premium on space-efficient port-specific electronics.

Through the use of single-chip PHY devices and high speed programmable logic devices (PLDs) such as field programmable gate arrays (FPGAs), segment 601 can be realized with an SFP device and a few electrical processing chips. Over time, further integration may be possible.

Lastly the output signals of segments 601-1-601-N are connected to Shared module 602. Element 602 includes multiplexing of the time slots, switching, and add/drop circuits that are capable of time slot rearrangement and signal routing between ports in network element 600 or between different networking elements. These functions are conventional and well known to persons skilled in the art. It may be noted that module 602 may contain a time-slot interchanging switch that may function as a centralized single element, or may realized a distributed switch when interconnected with other modules 602 that are associated with other network elements. As with other components/circuits described above, module 602 is implemented in field programmable gate array devices (FPGAs).

Figure 7:
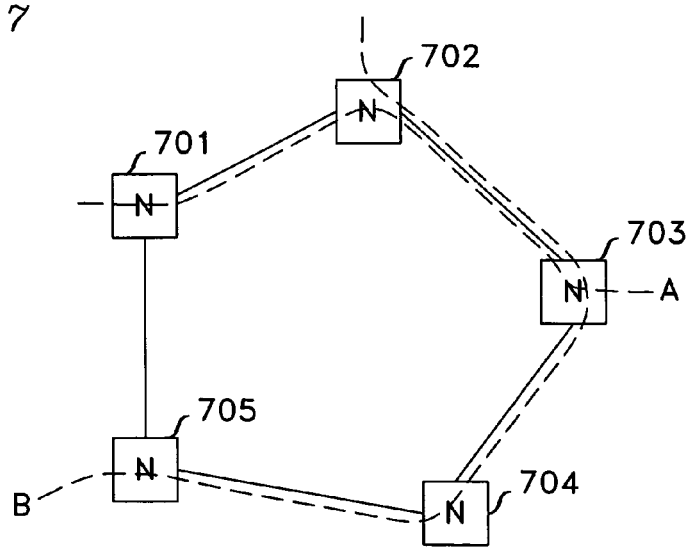
FIG. 7 shows a network that employs the FIG. 6 equipment element in at least some of the nodes.

FIG. 7 illustrates a multi-node network (700) built of nodes (701, 702 . . . ) constructed with the network element shown in FIG. 6. For simplicity, a ring configuration of 5 nodes is illustrated, but more diverse network topologies such a mesh or multi-ring are equally applicable. Such a network can be used to demonstrate the importance of protocol-independent add/drop for transparency. Imagine that protocol of type 'A' is supplied to node 701, destined to exit the network at node 703. In transit of intermediate node 702, traffic of protocol type 'B' is supplied. When type 'B' protocol is supplied, the switching function of element 602 of FIG. 6 is important. In this element operations are performed at the time slot level, and not at the protocol-specific level. By operating at the time slot level, element 602 does not require any protocol-specific awareness. This permits node 702 to operate without the need for any knowledge of operations specific to protocol 'A', and it need only be aware of protocol 'B', with which it is necessarily concerned because it is being introduced to the network at this point. Similarly, no knowledge of protocol 'B' is required at node 703.

In the course of node transit, it is desirable that information on the quality of the signal be available, even if the signal is not expressed to the level of protocol awareness. The ability to perform this protocol-independent quality of service monitoring, another of the value propositions for transparency, must therefore also reside in element 602, since this element is the only element transited by traffic passing through the node.

For a service provider, the services supported on a port may be associated with a customer distinct from one supported on a different port. Both ports may reside on the same network element 600. In the event that a provider is providing service for one customer, it is highly desirable that service to this customer not be affected by operations required for another customer. That is, if one port of element 600 is in service, operations performed on another port on that element should not affect the port that is in service. By realizing port-specific functions independently, it will be evident to skilled practitioners that one may program and provision a given protocol on one port without disturbing other ports, even when said ports reside on the same PCB.

Consider the implications for realizing transparent any-protocol networks with and without elements of the type shown in FIG. 6. Without it, specific network elements for each protocol are required, and the nodes in FIG. 7 become diverse as protocols proliferate in the network. Service providers must take care to determine in advance which protocols will be needed at a given node, and repair and replacement of faulted network elements becomes more complicated. By contrast, with network elements of the type shown in FIG. 6, reprovisioning is a matter of loading a new programmable code and setting a particular configurable optical interface, thereby greatly simplifying the realization of the network.

The invention claimed is:

1. A multi-port network element, comprising:
a plurality of segments, each of which includes
   a port;
   a configurable input-output device coupled to said port;
   a circuit to recover a clock signal from a user signal received through said port; and
   a programmable logic device that handles protocol-specific functions relative to said user signal, which device is adapted to handle any protocol agreed to by a party managing said network element and a user providing said user signal;
wherein said circuit to recover a clock signal is adapted to operate with said protocol agreed to by said party managing said network element and said user;
wherein said protocol-specific functions of said programmable logic device comprise circuitry for creating time slots in an Optical Transport Unit level-1 (OTU1) and inserting said received signal into said time slots and timing circuitry for adapting said received signal into said time slots, wherein said timing circuitry configured to compensate for timing impairments introduced end-to-end by mapping and unmapping processes and for timing impairments introduced by pointer adjustments from previous nodes; and
wherein said timing circuitry is further configured to write phase-offset information to a frame overhead area, said phase-offset information enables an egress node to regenerate an accurate clock for the user signal.

2. The element of claim 1 wherein said input-output device is an optical input-output device.

3. The element of claim 1 wherein said input-output device is configurable.

4. The element of claim 1 wherein said input-output device is pluggable.

5. The element of claim 1 wherein one segment is configured to handle one protocol, while another segment is configured to handle a different protocol.

6. The element of claim 5 wherein different protocols include two protocols that differ from each other solely in the data rate employed.

7. The element of claim 1 wherein said protocol specific-functions of said programmable logic device comprise protocol-specific monitoring of service modules.

8. The element of claim 1 wherein said protocol-specific functions of said programmable logic device further comprise timing circuitry for adapting said received signal into said time slots.

9. The element of claim 1 further comprising a module coupled to said plurality of segments that possesses a protocol-independent add-drop capability.

10. The element of claim 9 wherein said module comprises circuitry for transferring information received from one segment of said network element to another segment of said network element.

11. The element of claim 1 embedded in a network node comprising additional 0 or more instances of the claim 1 element.

12. The element of claim 11 interconnected to one or more instances of the claim 11 element to form a network.

13. A network that includes a plurality of interconnected nodes, in which signals are transmitted in serial streams, comprising:
   a client signal being transmitted from one node of said network to another node of said network by means of said serial streams, wherein said client signal is time-division-multiplexed onto a serial stream with other signals having other protocols and data rates than those of said client signal;
   wherein said serial streams comprise an Optical Transport Unit level-1 (OTU1) with a plurality of time slots;
   wherein said client signal is time-division-multiplexed into one or more of said plurality of time slots of said OTU1;
   wherein each of said plurality of interconnected nodes is configured to compensate for timing impairments introduced end-to-end by mapping and unmapping processes and for timing impairments introduced by pointer adjustments from previous nodes; and
   wherein each of said plurality of interconnected nodes comprises:
      a buffer for the said serial streams;
      a clock recovery circuit adapted to develop an estimate of the rate at which bits of frames appear in said serial streams;
      a processor, responsive to said applied signal and to said clock recovery circuit, adapted for developing a gated clock that corresponds to payload portions of said frames, and for extracting phase-offset information from overhead portion of said frames; and
      means for writing and reading said serial streams in and out of said buffer responsive to said clock recovery circuit, an oscillator, and said phase-offset information.

14. The network of claim 13 wherein the protocol and data rate of said one client signal is selected by a user that provides said one client signal, without regard to protocols and data rates of other signals.

15. The network of claim 13 wherein said client signal is a SONET signal and said serial streams employ asynchronous timing adaptation within said plurality of time slots of said OTU1.

16. The network of claim 13 wherein said bit streams employ the G.709 digital wrapper protocol with said OTU1 dividing into said plurality of time slots, and wherein said plurality of time slots comprises 16 time slots.

17. A port element of a data communications network, said port element comprising:
- a user-configurable optical input/output port;
- a continuous-rate device that performs clock-recovery and deserialization of a signal received via said input/output port;
- a timing control element including a reprogrammable digital phase locked loop that is coupled to said continuous-rate device;
- a protocol-specific monitoring module coupled to said timing control element, said protocol-specific monitoring module is configurable to support a plurality of protocols, and
- a mapping module configured to perform protocol-independent mapping functions to multiplex a protocol from said user-configurable optical input/output port to one or more of a plurality of time slots of an Optical Transport Unit level-1 (OTU1);

wherein said timing control element, said protocol-specific monitoring module, and said mapping module are configured to compensate for timing impairments introduced end-to-end by mapping and unmapping processes and for timing impairments introduced by pointer adjustments from previous nodes; and wherein said timing control element is configured to write phase-offset information to a frame overhead area, said phase-offset information enables an egress port element to regenerate an accurate clock for the signal.

18. The port of claim 17 wherein said protocol-independent mapping function makes use of the digital wrapper protocol G.709, and wherein said Optical Transport Unit level-1 (OTU1) comprises timing adaptation based upon said protocol.

19. The port of claim 17 wherein said protocol-independent mapping function is an extended G.709 Digital Wrapper protocol, arranged to employ frames of 15240 columns by four rows.

20. The port of claim 17 wherein said digital phase locked loop, said protocol-specific monitoring functions and said protocol-independent mapping function are realized in a single programmable logic device.

21. The port of claim 17 wherein said mapping module comprises a switching function.

22. The port of claim 21 wherein said switching function is realized in a programmable logic device (PLD).

23. A network comprising at least one port as defined in claim 17.

24. A network comprising interconnected ports as defined in claim 17.

* * * * *